United States Patent [19]

Wilbeck

[11] 3,727,697
[45] Apr. 17, 1973

[54] EARTH WORKING IMPLEMENT WITH A PAIR OF MOBILE UNITS MOVABLE BETWEEN A SIDE-BY-SIDE WORKING POSITION AND A TRAILING POSITION

[75] Inventor: Robert A. Wilbeck, Reno, Kans.

[73] Assignee: Wibeck Machine and Manufacturing, Inc., South Hutchinson, Kans.

[22] Filed: Feb. 22, 1971

[21] Appl. No.: 117,344

[52] U.S. Cl. ................... 172/313, 56/228, 172/568, 280/412
[51] Int. Cl. .......................................... A01b 23/04
[58] Field of Search ........... 172/245–246, 248, 249, 172/250, 253, 310–311, 313–314, 319–320, 328, 255, 568, 581, 597, 680, 584, 587; 56/228; 280/409, 412, 413, 414.5

[56] References Cited

UNITED STATES PATENTS

| | | | |
|---|---|---|---|
| 2,469,622 | 5/1949 | Acton | 172/255 |
| 3,292,948 | 12/1966 | McMasters et al. | 172/311 |
| 3,334,916 | 8/1967 | Tibbals | 172/310 |
| 3,008,732 | 11/1961 | Raney | 172/248 |
| 3,064,996 | 11/1962 | Roppel | 172/311 |
| 3,387,861 | 6/1968 | Bauman | 280/412 |
| 3,135,337 | 6/1964 | Morris | 280/412 |
| 3,292,714 | 12/1966 | Tsuchiya | 172/328 |
| 3,620,308 | 11/1971 | Christopher | 172/248 |
| 2,136,550 | 11/1938 | Howard | 172/314 |
| 3,239,014 | 3/1966 | Oerman et al. | 172/314 |
| 2,139,200 | 12/1938 | Moyer | 172/311 |

Primary Examiner—Robert E. Pulfrey
Assistant Examiner—C. W. Hanor
Attorney—Fishburn, Gold and Litman

[57] ABSTRACT

An earth working implement having a pair of mobile units movable between a side-by-side working position and a trailing position behind a prime mover is disclosed which includes an adjustable tongue structure on a forward end of each mobile unit for connection together and to the prime mover. A tow bar has one end thereof pivotally mounted on one of the mobile units and the other end engageable with the tongue structure of the other unit to permit same to be moved to a trailing position behind the one unit upon forward movement of the prime mover. A suitable member is mounted between the units and connected thereto for maintaining same in side-by-side working position until said units are to be moved to a trailing position for transporting the implement.

5 Claims, 9 Drawing Figures

PATENTED APR 17 1973

INVENTOR
Robert A. Wilbeck
BY
ATTORNEYS

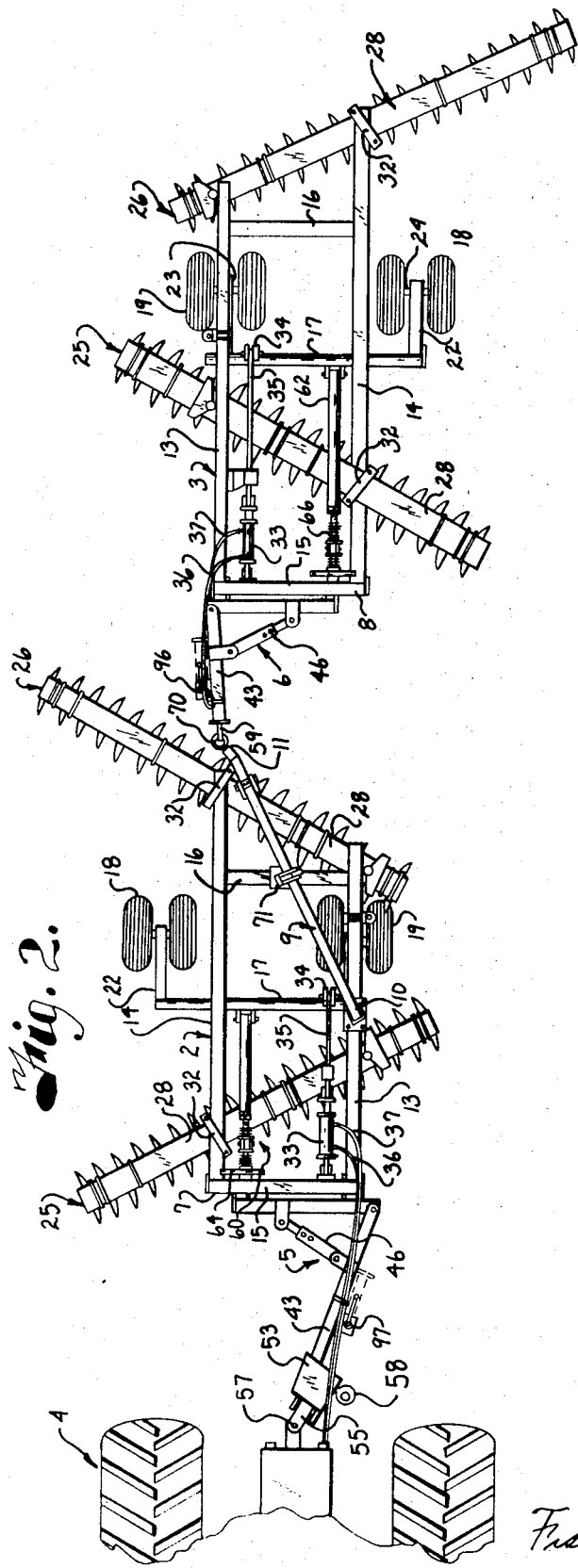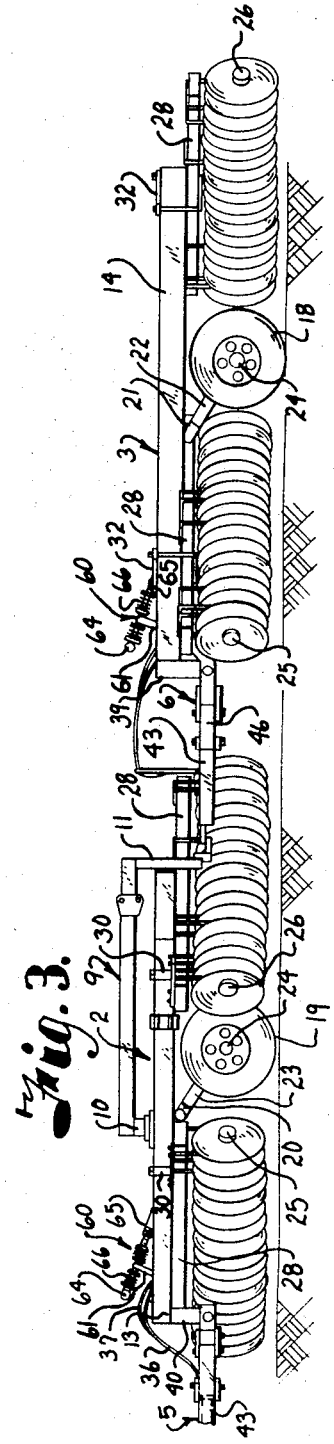

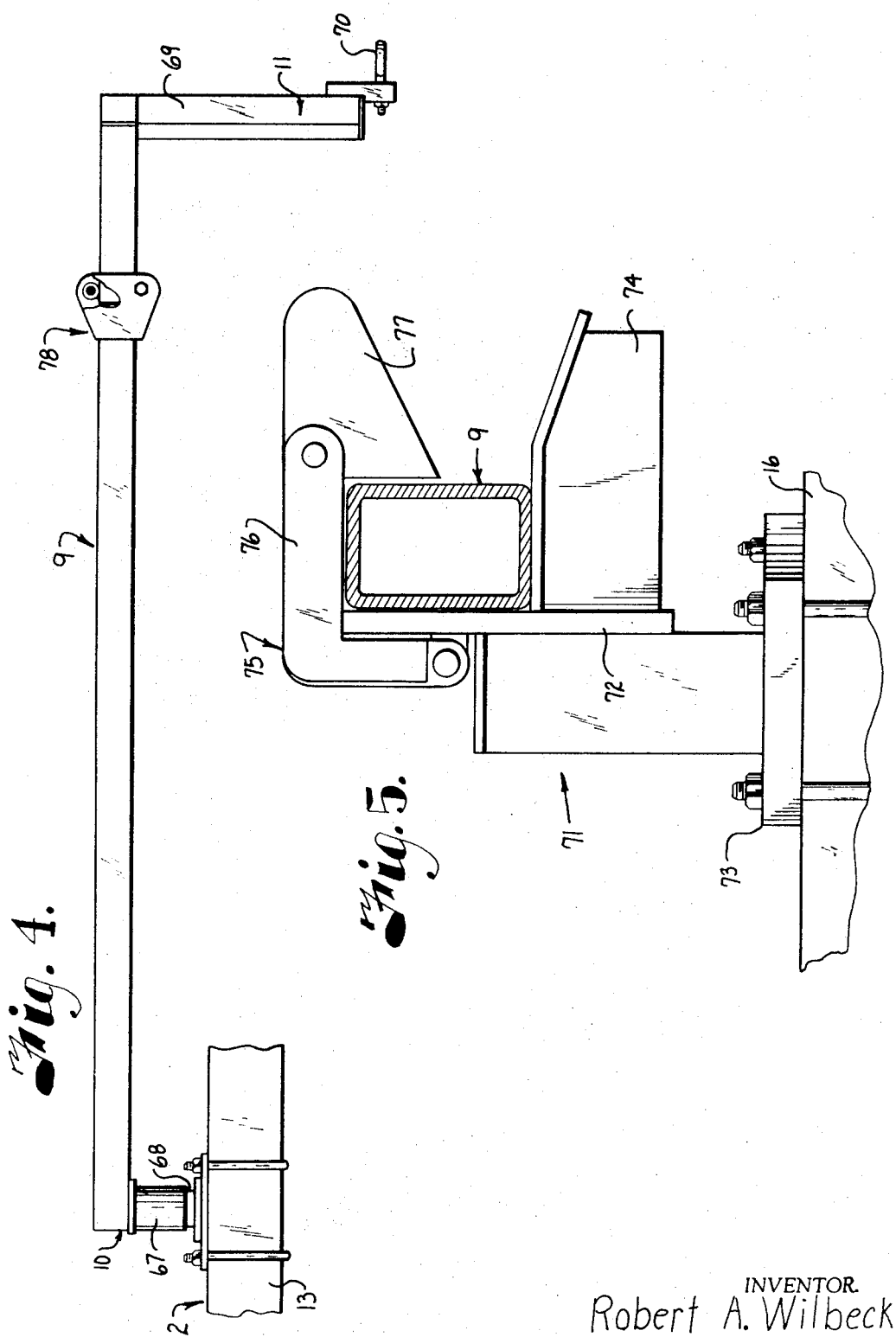

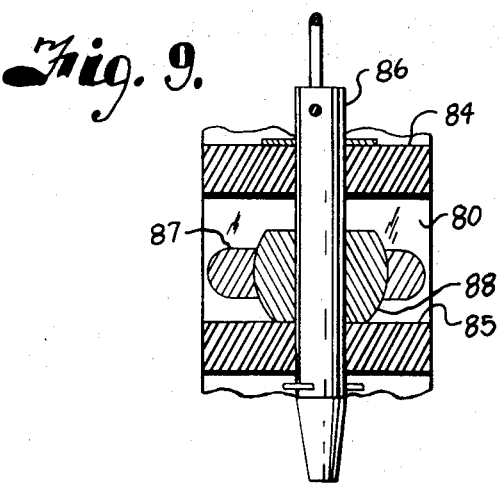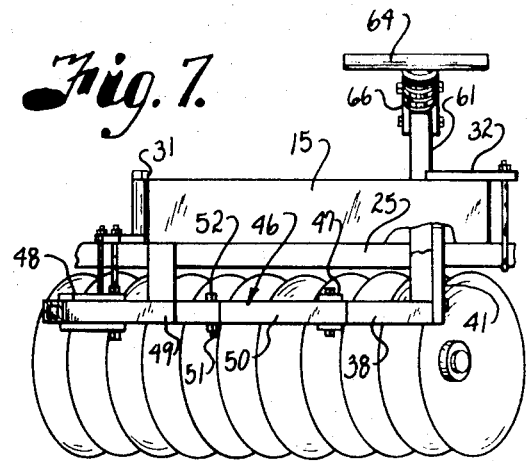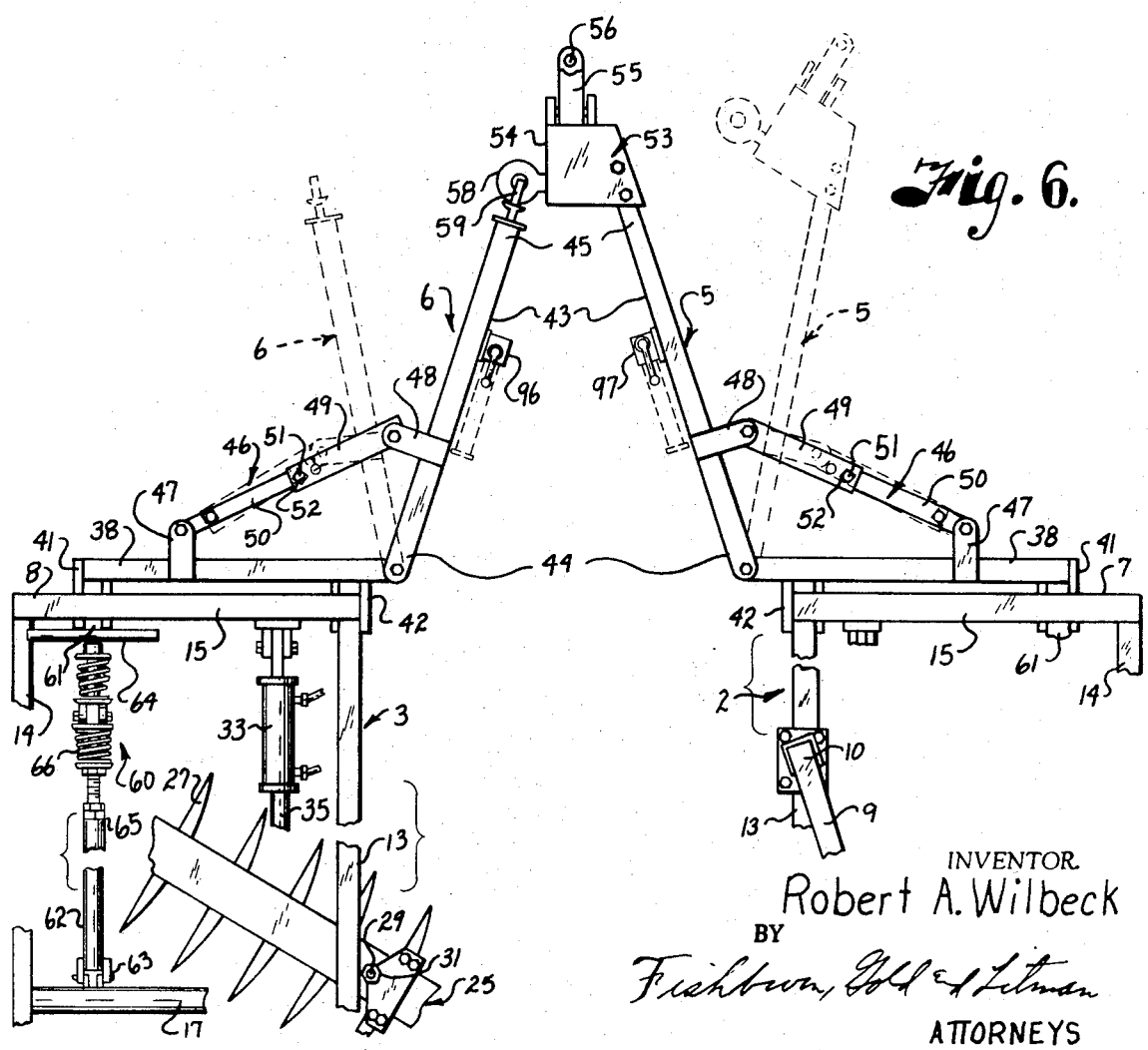

EARTH WORKING IMPLEMENT WITH A PAIR OF MOBILE UNITS MOVABLE BETWEEN A SIDE-BY-SIDE WORKING POSITION AND A TRAILING POSITION

The present invention relates to earth working implements and more particularly to an earth working implement having a pair of mobile units maintained in a side-by-side position and having means engageable with the units to permit moving same from the side-by-side position to a trailing position.

The principal objects of the present invention are: to provide an earth working implement having a pair of mobile units movable between a side-by-side position and a trailing position of one of the implements; to provide such an earth working implement having units effective to work a wide pass through fields and to be converted to a narrow dimension for traveling along a lane of roads and highways; to provide such an earth working implement wherein conversion between field or working and road or transporting positions is extremely simple and is effected by cooperation between novel hitch or tongue structures and a tow member for effecting movement of one of the units from a side-by-side position to a trailing position and return; to provide such an earth working implement having a holding structure mounted on one of the mobile units for holding the tow member in a towing position with the mobile units positioned in a trailing relation behind a prime mover; and to provide such an earth working implement which is unique and simple in design, durable in construction, economical to manufacture, easily maintained, positive in operation, and particularly well adapted for the proposed use.

Other objects and advantages of this invention will become apparent from the following description taken in connection with the accompanying drawings wherein are set forth by way of illustration and example certain embodiments of this invention.

FIG. 2 is a plan view of the earth working implement showing mobile units in a trailing position behind a prime mover and adjusted positions of tongue structures of each of the mobile units.

FIG. 3 is a side elevational view of the earth working implement having the units in trailing relation for transporting the implement over roads and between fields.

FIG. 4 is an enlarged fragmentary elevational view of a tow bar operative to effect movement of one unit from a side-by-side position to a trailing position behind the other unit and the prime mover.

FIG. 5 is an enlarged fragmentary elevational view of a tow bar holding structure for holding the tow bar in a storage position and a towing position with a storage or folded position of the tow bar shown in broken lines.

FIG. 6 is an enlarged fragmentary plan view of tongue structures of the units for connection to a prime mover and showing an alternate position for each tongue structure in broken lines.

FIG. 7 is an enlarged fragmentary front elevational view of the earth working implement.

FIG. 9 is an enlarged fragmentary sectional view showing a ball and socket joint of each end of a spacer and fastening member.

Figure 1:
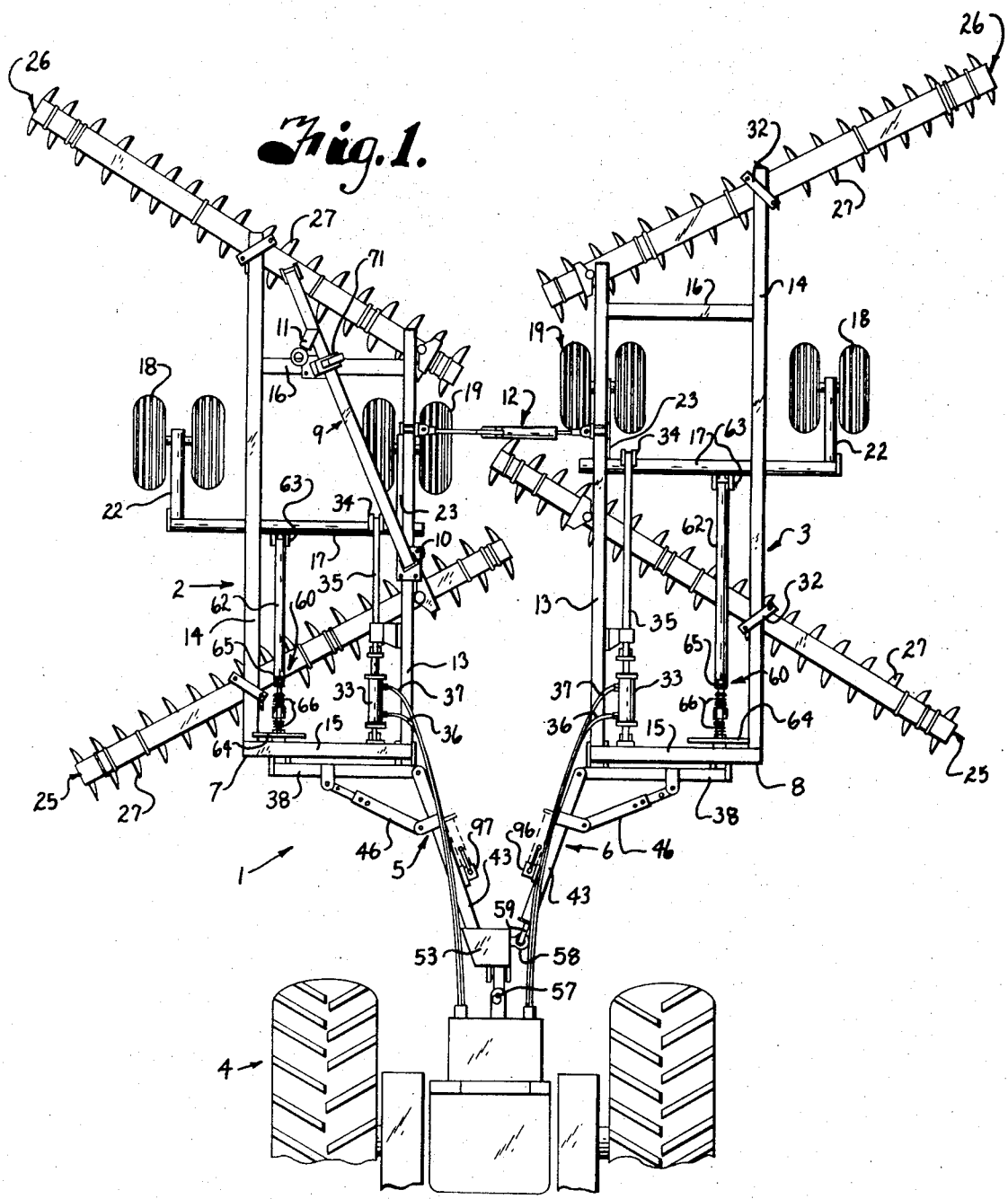
FIG. 1 is a plan view of an earth working implement embodying features of the present invention and having a pair of mobile units positioned in side-by-side relation for working of fields.
Figure 8:
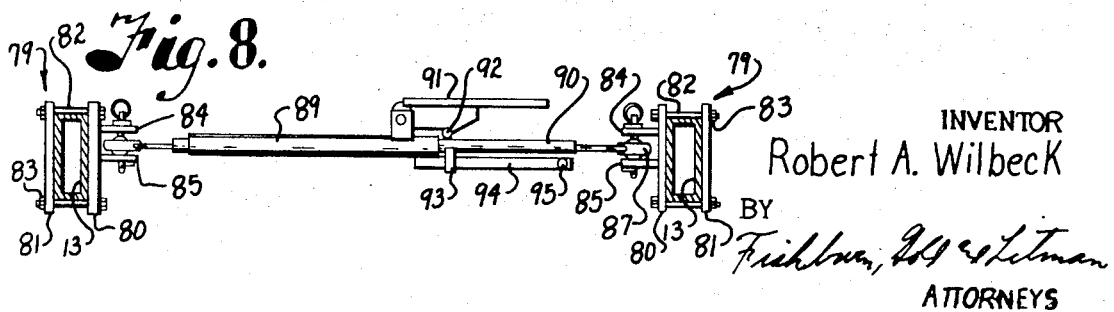
FIG. 8 is an enlarged fragmentary elevational view of a fastening member for maintaining the units in spaced side-by-side position while permitting independent raising and lowering of each of the units.

Referring more in detail to the drawings:

As required, detailed embodiments of the invention are disclosed herein, however, it is to be understood that the embodiments are merely exemplary of the invention which may be embodied in many forms that are different from those illustrative embodiments presented herein. Therefore, specific structural and functional details disclosed herein are not to be interpreted as limiting but merely as a basis for the claims actually defining the scope of the invention. In this regard it is to be recognized that earth working implements in accordance herewith may be embodied in various forms having various mobile supports and various earth working members and furthermore that such structures may be variously actuated, leveled, and adjusted, however, the disclosure hereof is presented only as a representative basis for teaching one skilled in the art to variously employ the present invention in virtually any appropriate detailed structure.

The reference numeral 1 generally designates an earth working implement having a pair of mobile units 2 and 3 shown as right and left respectively, movable between a field or side-by-side position and a trailing position behind a prime mover 4. The earth working implement 1 includes adjustable tongue structures 5 and 6 mounted on respective forward ends 7 and 8 of the mobile units 2 and 3 for connecting same to the prime mover 4. A tow bar 9 has one end 10 thereof pivotally mounted on one of the mobile units, for example the right mobile unit 2, and an other end 11 thereof engageable with the tongue structure 6 of the other or left unit 3 to permit same to be moved to a trailing position behind the one or right unit 2 upon forward movement of the prime mover 4.

It is preferred that a spacer and fastening member 12 be removably mounted between the units 2 and 3 and connected thereto for maintaining same in a spaced side-by-side position until said units are to be moved to a trailing position for transporting the implement 1.

Each of the mobile units 2 and 3 have suitable frames which may be similar in construction except for the tongue structures 5 and 6. If the nature of the implements are such that a difference is desired, as for example, an overlapping of the respective working areas, then one of the frames, for example the right frame, may be slightly shorter than the left frame for positioning of ground working elements, as later described. Each of the frames has laterally spaced side members 13 and 14, shown as inside and outside members respectively when the frames are in the side-by-side field working position. The side members 13 and 14 each have their forward ends suitably secured to a forward or front member 15 of the frames of the mobile units 2 and 3. A rear member 16 extends between and has opposite ends thereof suitably secured to the side members 13 and 14 respectively and is positioned adjacent the rear ends thereof to thereby from a substantially rigid frame.

Independently raising and lowering of the mobile units 2 and 3 is desired to selectively move ground or earth working elements into and out of earth working position, therefore, an elongated shaft 17 is rotatably mounted on each of the frames and has suitable rotatably mounted ground engaging members, such as wheels arranged in pairs 18 and 19, at opposite ends of the elongated shaft 17 respectively to thereby movably support the respective frames. In the illustrated structure, the elongated shaft 17 is positioned below the side members 13 and 14 and is supported in suitable bearings (not shown) mounted in brackets 20 and 21 depending from the side members 13 and 14 respectively. Arms 22 and 23 depend from opposite ends of the elongated shaft 17 and each have a suitable axle 24 mounted adjacent a lower end thereof and extending outwardly from opposite sides of said arms for rotatably mounting the respective pairs of wheels 18 and 19.

The earth working implement 1 has suitable elements or members mounted on each of the mobile units 2 and 3 for earth working as the units are moved forward by the prime mover 4. The earth working members may have any suitable shape, such as plows, rakes, discs, or the like, however, in the illustrated structure, the implement 1 has at least one gang of earth working discs mounted on each unit and positioned to have the paths of end discs of the gangs overlap at the centerline of the earth working implement 1. The wheel mounting is preferably positioned intermediate the ends of the respective frames and front and rear gangs 25 and 26 respectively of spaced discs 27 are mounted on the frames forwardly and rearwardly of the wheel mounting.

The front and rear gangs 25 and 26 and the discs 27 thereon for each mobile unit 2 and 3 are positioned to equalize forces applied to the respective unit during earth working operations whereby each unit and the implement 1 will more forwardly without sidedraft thereby effecting simple operation of the implement 1.

In the illustrated structure, the front gang 25 on one of the mobile units, for example, the right unit 2, is positioned forwardly of the front gang 25 on the other or left unit 3 to permit the adjacent ends of the front gangs 25 to overlap at the centerline of the implement. The front gangs 25 on the units 2 and 3 diverge outwardly and forwardly from the adjacent ends thereof and at substantially equal angles with the centerline of the implement.

The rear gang 26 on the right unit 2 is positioned forwardly of the rear gang 26 on the left unit 3 to thereby permit the right unit to be slightly shorter than the left unit and the rear gangs 26 on the units 2 and 3 diverge outwardly and rearwardly from the adjacent ends thereof and at substantially equal angles with the centerline of the implement whereby the sidedraft of the front gangs 25 is equalized by the sidedraft of the rear gangs 26 for each unit and for the entire implement 1.

The front and rear gangs 25 and 26 are adjustable in position on the respective mobile units 2 and 3 to compensate for a change in the direction of application of a pulling force, as when one of the mobile units is used alone for earth working operations. In the illustrated structure, each gang of discs 27 includes a beam or support member 28 having a shaft or pin 29 extending upwardly therefrom to be received in a sleeve 30 mounted on the inside side member 13 of the respective frame and the pin 29 is suitably retained in the sleeve 30, as by having an upper end thereof threaded to receive a suitable nut 31 thereon to thereby pivotally support the inside end of the respective beam or support member 28 on the inside side member 13 adjacent the centerline of the implement 1.

The other end of each beam or support member 28 is adjustable along the outside member 14 to vary the direction of application of the earth working force of the respective gang of discs 27 to the mobile unit supporting same to balance the force of the other gang of discs 27 on the respective mobile unit. In the illustrated structure, a suitable clamp supports the beam in clamped engagement with the respective outside side member 14 and includes a pair of spaced plates 32 held in engagement with the side member 14 and the beam 28 respectively by suitable fastening members, such as a plurality of spaced bolts each having nuts removably mounted on one end thereof.

Rotation of the elongated shaft 17 is effective to raise and lower the respective mobile units 2 and 3 and the gangs 25 and 26 of the discs 27 mounted thereon. In the illustrated structure, a suitable extensible member 33 has one end secured to the forward or front member 15 of the respective frame and the other end pivotally connected to an ear 34 extending from the elongated shaft 17 whereby extension and retraction of the extensible member 33 is effective to rotate the elongated shaft 17 to thereby selectively raise and lower the respective frame to move the earth working elements or members into and out of an earth working position.

The extensible member 33 is illustrated as a hydraulic cylinder having a suitable piston movable therein to extend and retract a piston rod 35 in response to communication of a suitable hydraulic fluid to the cylinder adjacent opposite ends thereof. The hydraulic cylinder is connected in a conventional manner by suitable hydraulic lines 36 and 37 adjacent respective opposite ends to a source of hydraulic power, such as a hydraulic pressure system on the prime mover 4 which is under control of the operator thereof. The hydraulic lines 36 and 37 are so connected to the source of hydraulic power that each frame may be independently and selectively raised and lowered.

The tongue structures 5 and 6 are substantially similar in construction and in the illustrated structure, each includes a base member 38 mounted on the forward or front member 15 of the respective frame and each of the base members 38 are pivotally mounted for movement in an arc about the forward ends 7 and 8 of the mobile units 2 and 3 respectively. In the illustrated pivotal mounting, the forward member 15 of each of the frames has depending portions 39 and 40 adjacent respective opposite ends thereof and each base member 38 has spaced ears arranged in pairs 41 and 42 of spaced plates adjacent respective opposite ends thereof with the pairs of ears being pivotally mounted on the depending portions 39 and 40 respectively.

Each of the tongue structures 5 and 6 includes a draw member 43 having one end 44 thereof pivotally mounted on a respective base member 38 and extends forwardly therefrom. The one end 44 is preferably mounted adjacent an end of the base member 38 nearest the centerline of the earth working implement 1 when the mobile units 2 and 3 are positioned in working or side-by-side relation. The draw members 38 each are elongated members having the respective axis thereof forming substantially equal angles with the centerline of the implement 1 when the other or free ends 45 of the draw members 38 are connected together and the units are in side-by-side working position.

Each tongue structure includes an adjustable spreader member 46 extending between and having opposite ends thereof pivotally connected to the base member 38 and the draw member 43 respectively for adjusting an angular relation between the base member 38 and the draw member 43. In the illustrated structure, ears 47 extend from the base member 38 and ears 48 extend from the draw member 43 for pivotally supporting respective opposite ends of the spreader member 46. The spreader member 46 is illustrated as having a tubular first portion 49 and a second portion 50 slidably received therein with the portions 49 and 50 each having a plurality of apertures spaced therealong with the apertures in the first and second portion 49 and 50 being selectively alignable to receive suitable fastening devices, such as bolts 51 and nuts 52, for holding the spreader member 46 in a selected adjusted position.

Free ends 45 of the draw members 43 of the tongue structures 5 and 6 have means thereon for effecting a connection between the tongue structures 5 and 6 and the prime mover 4. In the illustrated structure, the draw member connection means includes a clevis assembly 53 mounted on a free end 45 of one of the draw members 43, for example the draw member of the tongue structure 5, mounted on the right mobile unit 2.

In the illustrated embodiment, the clevis assembly 53 includes a mounting portion 54 suitably secured on the free end 45 of the respective draw member, as by welding, and a pair of vertically spaced plates 55 extending forwardly from the mounting portion 54 and each having an aperture 56 therein. The apertures are aligned and positioned to be on the centerline of the implement 1 when the units 2 and 3 are in side-by-side position and to receive a suitable fastening member 57, such as a pin, bolt, or the like, to pivotally connect the clevis assembly 53 to the prime mover 4.

A towing ring 58 is mounted on the mounting portion 54 of the clevis assembly 53 and extends laterally outwardly therefrom to be releaseably engaged by a pintle hook 59 secured on a free end 45 of the draw member 43 of the tongue structure 6. The pintle hook 57 is of conventional structure such as sold by Holland Hitch Company, Holland, Mich., page 10, Model 75 catalogue P H 69. When the pintle hook 59 releaseably engages the towing ring 58 and the clevis assembly 53 is connected to the prime mover 4 and the spacer and fastening member 12 is in position between the mobile units 2 and 3, forward movement of the prime mover 4 effects coordinated forward movement of both of the mobile units 2 and 3, such as for earth working of fields.

The mobile units 2 and 3 are independently adjusted by a leveling device 60, to maintain same in a substantially level position during earth working operations. In the illustrated structure, each leveling device 60 includes a suitable lever 61 which has a lower end thereof connected to the base member 38 of the respective tongue structures 5 and 6 and pivotally mounted on one of the depending portions of the front member 15 and an adjustable member 62 extends between and has respective opposite ends pivotally connected on an upper end of the lever 61 and an ear or arm 63 extending outwardly from the elongated shaft 17.

A suitable handle or crank 64 is mounted on an upper end of the adjustable member 62 for effecting a change in the length thereof, as by a telescopeable joint 65 intermediate the ends thereof, and movement of the lever 61 and thereby movement of the base member 38 of the respective tongue structures 5 and 6 to thereby adjust the vertical position of the respective tongue structure and the vertical position of the forward end of the respective mobile unit to thereby level same when the earth working elements are in any selected position. Suitable resilient members 66 are mounted on the adjustable member 62 and positioned on opposite sides of the upper end of the lever 61 to absorb shock during earth working operations.

The tow bar 9 is pivotally mounted on the right unit 2 and pivotally connectable to the free end 45 of the draw member 43 of the tongue structure 6 of the left unit 3 to permit same to move from a position alongside the right unit 2 to a position behind same. In the illustrated structure, the tow bar 9 is an elongated member having a depending portion 67 at the one end 10 thereof with the depending portion 67 being received within a support bracket 68 mounted on and positioned intermediate the ends of the inside side member 13 of the right mobile unit 2 thereby positioning the one end 10 adjacent the centerline of the earth working implement 1 when the units are in working position. The other end 11 of the tow bar 9 has an offset depending arm 69 having a towing ring 70 mounted on a lower end thereof for effecting a releaseable and pivotal connection with the pintle hook 59 on the free end of the draw member 43 of the tongue structure 6.

The tow bar 9 is held in a storage position or a towing position on the right mobile unit 2 by a holding structure 71. The illustrated holding structure 71 includes an upstanding portion 72 extending upwardly from a support bracket 73 mounted on and positioned intermediate the ends of the rear member 16 of the frame of the right mobile unit 2. The upstanding portion 72 is engageable by the tow bar 9 and a support arm 74 extends outwardly therefrom for supporting the tow bar 9 when same is in engagement with the upstanding portion 72. A holding member 75 has one end thereof pivotally mounted on an upper end of the upstanding portion 72 and is illustrated as a generally L-shaped member having an arm portion 76 engageable with an upper surface of the tow bar 9 and a keeper portion 77 pivotally mounted on a free end of the arm portion 76 with the keeper portion 77 being movable into engagement with the tow bar 9 for holding same in a towing position or in a storage position.

The other end 11 of the tow bar 9 extends rearwardly of the rear member 16 and the depending arm 69 has the towing ring 70 adjacent a ground surface when in earth working position, therefore, the tow bar 9 has a hinged joint 78 positioned between the depending arm 69 and the portion of the tow bar 9 engaged by the holding structure 71 to permit the depending arm 69 to be folded to a position above and in engagement with the portion of the tow bar 9 between the hinged joint 78 and the holding structure 71 thereby positioning the depending arm 69 to clear possible obstructions in a ground surface when the earth working implement 1 is being moved thereover with the units 2 and 3 positioned in the side-by-side earth working position.

The spacer and fastening member 12 is preferably a substantially rigid member adapted to resist and withstand both tension and compression as the mobile units 2 and 3 are performing earth working operations. The spacer and fastening member 12 has universal connections with the frames of the units to permit independent relative movement therebetween. It is preferable that the member 12 be formed in two sections which may be connected together to form a rigid structure and which permits relative movement between the two sections to lock the units in the side-by-side working position and to release and permit one of the units to move to a trailing position behind the other unit and the prime mover.

The spacer and fastening member 12 extends between and is connected to the frames of the mobile units 2 and 3 for maintaining same in spaced side-by-side relation and the spacer and fastening member 12 is illustrated as including a mounting bracket 79 on each of the facing inside side members 13 of the mobile units 2 and 3 for pivotally supporting respective opposite ends of the spacer and fastening member 12. Each mounting bracket 79 includes a pair of spaced plates 80 and 81 secured in clamping engagement with the respective side members 13 by suitable fastening devices, such as a plurality of spaced bolts 82 having nuts 83 thereon.

The plates facing the centerline of the earth working implement 1 when the units are in the side-by-side position each have upper and lower ears 84 and 85 respectively secured thereto and extending outwardly and toward the centerline of the earth working implement 1. The ears 84 and 85 of the mounting brackets 79 have aligned apertures therein to receive a suitable pin 86 for extending through an aperture in the respective end of the spacer member 12 for pivotally mounting the opposite ends thereof on the facing side members 13 of the mobile units 2 and 3.

The ends of the spacer and fastening member 12 are ball and socket joints to permit relative movement in any direction between the units 2 and 3 and the spacer and fastening member 12. In the illustrated structure, each of the ends of the spacer and fastening member 12 include a ring portion 87 having a ball portion 88 therein to form a ball and socket joint. The lower ears 85 of each mounting bracket 79 receive the respective ball portion 88 thereon to thereby support same and permit movement of the units and the spacer and fastening member in substantially any direction.

In the illustrated structure, the spacer and fastening member includes a first portion 89 having one end thereof pivotally mounted on one of the mounting brackets 79 and second portion 90 having one end thereof pivotally mounted on the other mounting bracket 79. The first portion 89 is illustrated as a generally tubular member adapted to receive a free end of the second portion 90 therein and the spacer and fastening member 12 includes means on the other or free ends of the first and second portions 89 and 90 for effecting a releaseable connection therebetween. In the illustrated connection means, one of the portions, for example the first portion 89, has a release member 91 pivotally mounted thereon which is engageable with an enlarged portion 92 of the second portion 90. The engagement is effective to move and hold the first and second portions 89 and 90 together to maintain a selected spacing between the mobile units 2 and 3.

The second portion 90 of the spacer and fastening member 12 is guided into the first portion 89 by suitable eye or guide 93 mounted on the second portion 90 and movable along an extension 94 of the first portion 89. The eye or guide 93 is movable between the free end of the first portion 89 and a stop or abutment 95 is removably mounted on the free end of the extension 94.

In preparation for using an earth working implement constructed as described and illustrated, the mobile units 2 and 3 are positioned in side-by-side relation and the tongue structures 5 and 6 are connected together and to the prime mover 4 and the spacer and fastening member 12 is connected together by the release member 91 engaging the enlarged portion 92 to thereby lock the portions of the member 12 together and maintain the units 2 and 3 in a selected lateral spacing. The extensible member 33 of each unit is independently adjusted to effect the desired penetration of the earth working members and the mobile units 2 and 3 are independently adjusted by the leveling device 60 to position and maintain the respective units in a substantially level position during earth working operations.

To change the earth working implement 1 from a field working or side-by-side position to a road or trailing position, the tow bar 9 is moved from a storage position to a position for connection to the tongue structure 6 in preparation for the maneuver by moving the other end 11 of the tow bar and the towing ring 70 thereon to a position adjacent the pintle hook 59 on the end of the draw member 43 of the tongue structure 6. The pintle hook 59 is then disengaged from the towing ring 58 on the clevis assembly 53 by raising the draw member 43 of the tongue structure 6 sufficiently, as by a jack 96, to permit the pintle hook 59 to be engaged with the towing ring 70 on the other end 11 of the tow bar 9.

The fastening members are removed from the spreader members 46 of the tongue structures 5 and 6 to permit same to adjust in length. The portions of the spacer and fastening member 12 are disconnected and the prime mover 4 is then moved forward with the tow bar 9 pivoting about the one end 10 to move the other end 11 thereof behind the right mobile unit 2 and thereby move the left mobile unit 3 forward. The initial forward movement of the prime mover 4 after the pintle hook 59 is connected to the towing ring 70 on the other end 11 of the tow bar 9 effects an outward movement of the mobile units 2 and 3 to separate same and then move the right unit in front of the left unit and the units are moved forward in the trailing position. The prime mover 4 is then stopped and the keeper portion 77 of the holding structure 71 is moved into a position engaging and holding the tow bar 9 in a towing position.

The spreader member 46 of each of the tongue structures 5 an 6 are thereby adjusted in length to the positions shown in FIG. 2 and the fastening members automatically drop in place when the apertures of the portions of the respective spreader members 46 are moved into proper alignment to maintain the position of the mobile units 2 and 3 directly behind a centerline of the prime mover 4 and to permit the prime mover 4 to pull same forward.

The mobile units 2 and 3 may be returned from a trailing position to the side-by-side position by substantially reversing the previously described adjustments and maneuvers and including reconnecting the draw members 43 together and swinging the tow bar 9 to a position engaging the holding structure 71 for storage therein until it is desired to again position the units in a trailing relation. The spacer and fastening member 12 is then reconnected to maintain the units 2 and 3 in the proper spacing for field earth working operations.

The draw members 43 of the tongue structures 5 and 6 have jacks 96 and 97 respectively mounted thereon to support and raise and lower same as desired during connecting same together and to the prime mover 4.

It is to be understood that while I have illustrated and described one form of my invention, it is not to be limited to the specific form or arrangement of parts herein described and shown.

What I claim and desire to secure by Letters Patent is:

1. An earth working implement comprising:
   a. a pair of spaced mobile frames each having a forward end;
   b. means on each of said frames for earth working as said frames are moved forward;
   c. an adjustable tongue structure mounted on the forward end of each of said mobile frames with forward ends of said tongues having connecting means for effecting connection of said frames to each other and to a prime mover for operation in side-by-side relation;
   d. rigid spacer means having ends releaseably connecting said spaced mobile frames in side-by-side relation and cooperating with the tongue structures to maintain of said frames during side-by-side operation, said spacer means being separated from one of said mobile frames for change of relative positions of said frames;
   e. tow bar means having one end portion pivotally mounted on one of said mobile frames swingable from a trailing relation to a forward relation and having a free end portion connectable with the connecting means on the tongue structure of the other frame when in said forward position and permitting same to be moved to a trailing position behind said one frame when said spacer means is separated from one frame and the tongue structures of said other frame is disconnected from the tongue structure of said one frame and upon forward movement of the prime mover and said one frame thereby effecting a trailing relation between said mobile frames;
   f. said tow bar means including an elongated tow bar having one end pivotally mounted on the one mobile frame intermediate ends thereof and adjacent a side toward said other frame when in side by side relation, said free end of said tow bar connectable wit the connecting means on the tongue structure of the other frame having means whereby the connection is releaseable, and means on the other frame and engageable with said tow bar for holding same against swinging movement in a towing position with the frames position in trailing relation behind the prime mover.

2. An earth working implement as set forth in claim 1 wherein said tow bar holding means comprises:
   a. a support bracket mounted on said one mobile frame;
   b. an upstanding portion extending upwardly from said support bracket and positioned to be engaged by said tow bar;
   c. a support arm extending outwardly from said upstanding portion and positioned to be engaged by said tow bar for supporting same thereon; and
   d. a holding member having one end pivotally mounted on said upstanding portion and having a movable portion engageable with said tow bar for holding same in engagement with said support arm.

3. An earth working implement comprising:
   a. a pair of spaced mobile frames each having a forward end;
   b. means on each of said frames for earth working as said frames are moved forward;
   c. an adjustable tongue structure mounted on the forward end of each of said mobile frames with forward ends of said tongues having connecting means for effecting connection of said frames to each other and to a prime mover for operation in side-by-side relation;
   d. rigid spacer means having ends releaseably connecting said spaced mobile frames in side-by-side operation, said spacer means being separated from one of said mobile frames for change of relative positions of said frames;
   e. tow bar means having one end portion pivotally mounted on one of said mobile frames swingable from a trailing relation to a forward relation and having a free end portion connectable with the connecting means on the tongue structure of the other frame when in said forward position and permitting same to be moved to a trailing position behind said one frame when said spacer means is separated from one frame and the tongue structures of said other frame is disconnected from the tongue structure of said one frame and upon forward movement of the prime mover and said one frame thereby effecting a trailing relation between said mobile frames;
   f. said tow bar means effecting a trailing relation between said mobile frames including:
      1. an elongated tow bar having one end pivotally mounted on the one mobile frame intermediate ends thereof and adjacent a side thereof toward said other frame when in side-by-side relation, the other end of said two bar extending rearwardly of said one mobile frame when said frames are in trailing relation;
      2. means on the other end of said tow bar for effecting a releasable connection with the connecting means of the tongue structure mounted on the other frame;
      3. means on the one frame and engageable with said tow bar for holding same in a towing position with the other end thereof extending rearwardly of said one mobile frame and with the frames positioned in trailing relation behind the prime mover; and 4. a hinged joint in said tow bar positioned to permit the other end of said tow bar to be moved to a position above said one mobile frame when said tow bar is disconnected from the tongue connecting means of said other frame and is in engagement with said tow bar holding means.

4. An earth working implement comprising:
a. a pair of spaced mobile frames each having a forward end and laterally spaced side members;
b. means on each of said frames for earth working as said frames are moved forward;
c. means on each of said mobile frames for selectively raising and lowering same to move said earth working means into and out of an earth working position and levelling of said frames;
d. an adjustable tongue structure mounted on the forward end of each of said mobile frames, each tongue structure having a draw member extending forwardly from said respective frame;
e. means on the free ends of each of said draw members for effecting connection of said draw members together and to a prime mover;
f. releaseable fastening spacer means extending between and connected to facing side members of said mobile frames for maintaining same in spaced side-by-side relation;
g. an elongated tow bar having one end thereof pivotally mounted on one of said frames and normally in a trailing relation and swingable to a forward relation, the other end of said tow bar having means thereon for releaseably engaging said connection means on the tongue structure of the other frame when disconnected relative to the prime mover and upon release of the spacer means from one frame permitting said other frame to be moved to a trailing position behind said one frame upon forward movement of the prime mover; and
h. means on the one frame and engageable with said tow bar for holding same in a towing position with the frames positioned in trailing relation behind the prime mover, said means holding the tow bar comprising:
 1. a support bracket mounted on said one mobile frame;
 2. an upstanding portion extending upwardly from said support bracket and positioned to be engaged by said tow bar;
 3. a support arm extending outwardly from said upstanding portion and positioned to be engaged by said tow bar for supporting same thereon; and
 4. a holding member having one end pivotally mounted on said upstanding portion and having a movable portion engageable with said tow bar for holding same in engagement with said support arm.

5. An earth working implement comprising:
a. a pair of spaced mobile frames each having a forward end;
b. means on each of said frames for earth working as said frames are moved forward;
c. an adjustable tongue structure mounted on the forward end of each of said mobile frames with each of said tongue structures having forward ends;
d. a connecting means assembly on the forward end on one of said tongue structures for effecting connection thereof to a prime mover;
e. said connecting means assembly on said one tongue structure having a towing ring extending laterally outwardly therefrom;
f. a pintle hook on the forward end of the other tongue structure and operable for releaseable connection to the towing ring on said connecting means assembly for connecting the tongue structures for operation of the mobile frame in side-by-side relation;
g. rigid spacer means having ends releaseably connecting said spaced mobile frames in side-by-side relation and cooperating with the tongue structures to maintain spacing of said frames during side-by-side operation, said spacer means being seperable from one of said mobile frames for change of relative positions of said frames;
h. tow bar means having one end portion pivotally mounted on one of said mobile frames swingable from a trailing relation to a forward relation and having a free end portion connectable with the connecting means on the tongue structure of the other frame when in said forward position and permitting same to be moved to a trailing position behind said one frame when said spacer means is separated from one frame and the tongue structures of said other frame is disconnected from the tongue structure of said one frame and upon forward movement of the prime mover and said one frame thereby effecting a trailing relation between said mobile frames;
i. a pulling ring mounted on the free end of said tow bar for releaseable connection with said pintle hook whereby forward movement of the prime mover moves the other mobile frame to a trailing position behind said one mobile frame;
j. said tow bar means including an elongated tow bar having one end pivotally mounted on the one mobile frame intermediate ends thereof and adjacent a side toward said other frame when in side by side relation, said free end of said tow bar connectable with the connecting means on the tongue structure of the other frame having means whereby the connection is releaseable, and means on the other frame and engageable with said tow bar for holding same against swinging movement in a towing position with the frames position in trailing relation behind the prime mover.

* * * * *